US008675447B2

(12) United States Patent
Poole

(10) Patent No.: US 8,675,447 B2
(45) Date of Patent: Mar. 18, 2014

(54) DEVICE AND METHOD FOR DE-BLENDING SIMULTANEOUS SHOOTING DATA

(75) Inventor: Gordon Poole, East Grinstead (GB)

(73) Assignee: CGGVeritas Services SA, Massy Cedex (FR)

( * ) Notice: Subject to any disclaimer, the term of this patent is extended or adjusted under 35 U.S.C. 154(b) by 236 days.

(21) Appl. No.: 13/345,113

(22) Filed: Jan. 6, 2012

(65) Prior Publication Data

US 2013/0176819 A1 Jul. 11, 2013

(51) Int. Cl.
*G01V 1/00* (2006.01)

(52) U.S. Cl.
USPC .................................. 367/41; 367/43; 702/14

(58) Field of Classification Search
USPC ....................................................... 367/41, 43
See application file for complete search history.

(56) References Cited

U.S. PATENT DOCUMENTS

| 4,295,213 | A | 10/1981 | Mifsud | |
|---|---|---|---|---|
| 5,721,710 | A | 2/1998 | Sallas et al. | |
| 7,768,872 | B2 * | 8/2010 | Kappius et al. | 367/56 |
| 7,916,576 | B2 * | 3/2011 | Beasley et al. | 367/38 |
| 7,953,556 | B2 * | 5/2011 | Craft et al. | 702/17 |
| 8,395,966 | B2 * | 3/2013 | Moore et al. | 367/38 |
| 2005/0027454 | A1 * | 2/2005 | Vaage et al. | 702/17 |
| 2010/0039894 | A1 | 2/2010 | Abma | |
| 2010/0271904 | A1 | 10/2010 | Moore et al. | |
| 2010/0299070 | A1 | 11/2010 | Abma | |
| 2011/0194378 | A1 | 8/2011 | Decker et al. | |

FOREIGN PATENT DOCUMENTS

EP 2594962 A2 5/2013

OTHER PUBLICATIONS

GB Search Report mailed Jun. 10, 2013 in related GB Application No. 1300123.5.
Moore et al., "Simultaneous Source Separation Using Dithered Sources" SEG Las Vegas 2008 Annual Meeting; pp. 2806-2810.
A.J. "Guus" Berkhout; The Leading Edge "Changing in the Mindset in Seismic Data Acquisition"; Delft University of Technology; The Netherlands; Jul. 2008; pp. 924-938.
Panagiotis Doulgeris et al.; "Separation of Blending Data by Iterative Estimation and Subtraction of Interference Noise"; Delft University of Technology.

* cited by examiner

*Primary Examiner* — Isam Alsomiri
*Assistant Examiner* — Hovhannes Baghdasaryan
(74) *Attorney, Agent, or Firm* — Patent Portfolio Builders PLLC

(57) ABSTRACT

A device, medium and method for de-blending seismic data associated with a subsurface of the earth. The method includes a step of receiving seismic data "d" recorded with one or more land receivers, wherein the seismic data includes shot recordings generated by plural sources that are simultaneously actuated; a step of forming either a continuous receiver trace or trace segments from the received seismic data; a step of selecting plural overlapping spatial blocks that cover the surface shot locations; a step of assigning the shot recordings to the plural overlapping spatial blocks; a step of applying a mathematical technique to the recordings to determine de-blended data; and a step of generating an image of the subsurface based on the de-blended data.

21 Claims, 12 Drawing Sheets

Figure 1A
Figure 1B
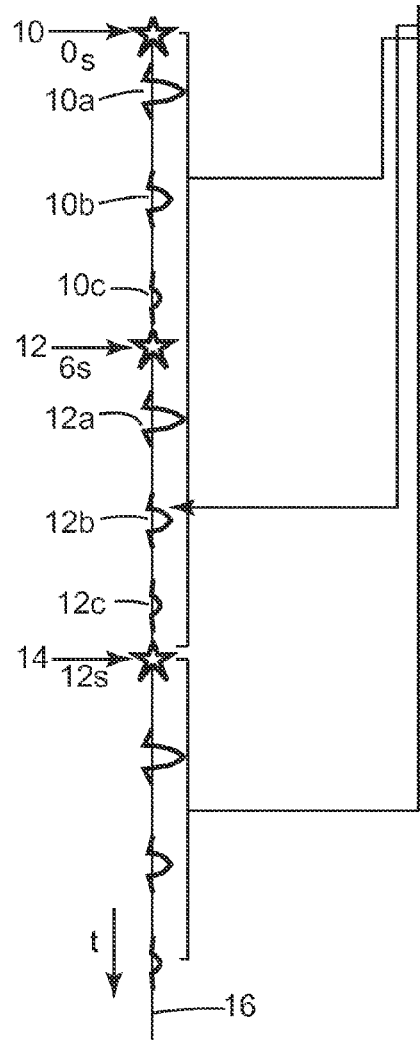
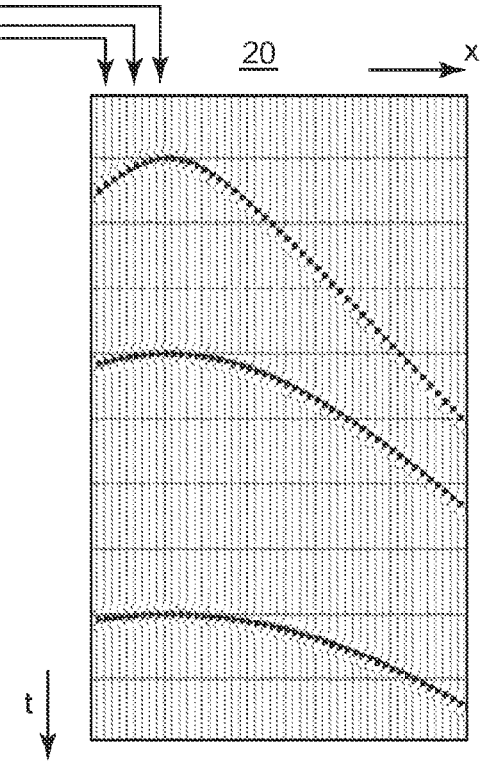

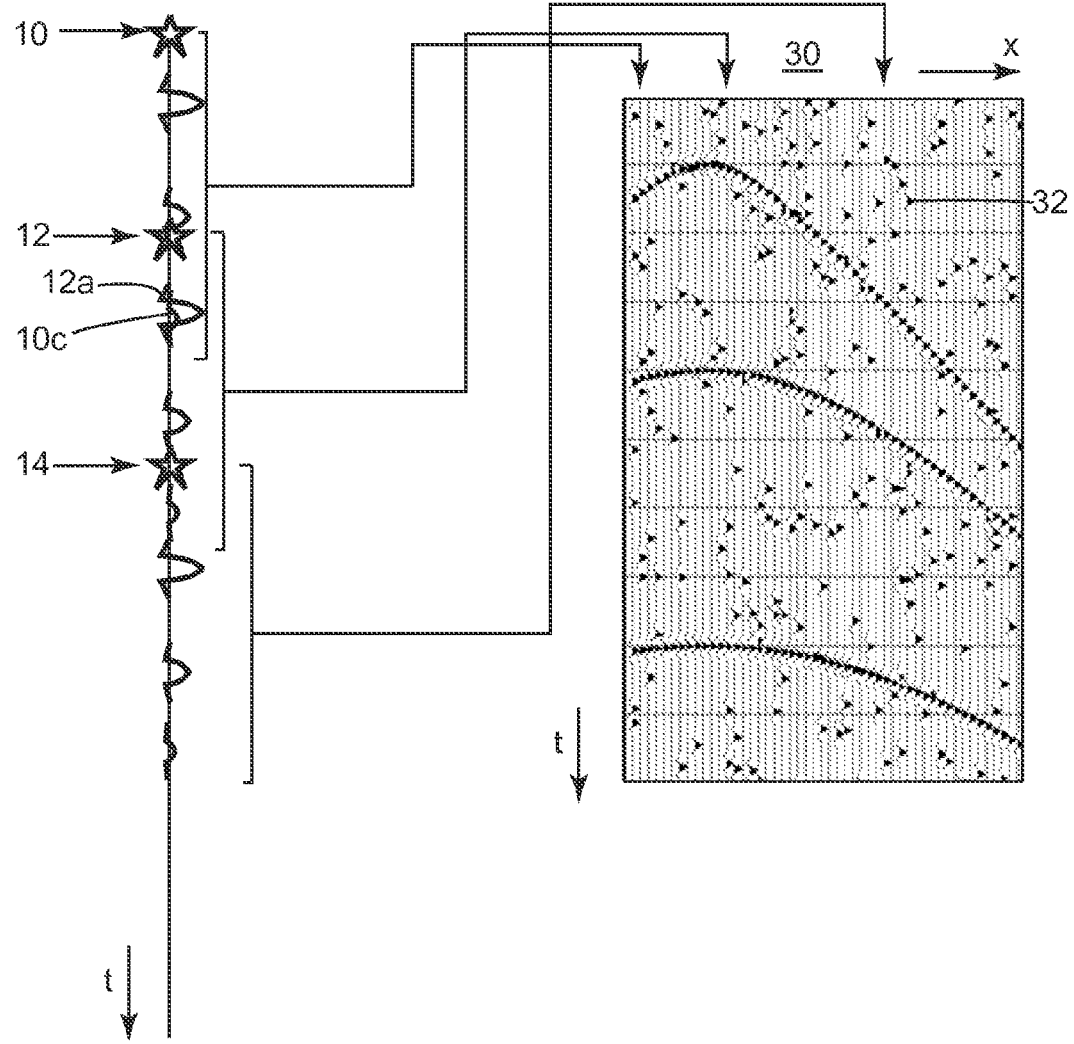

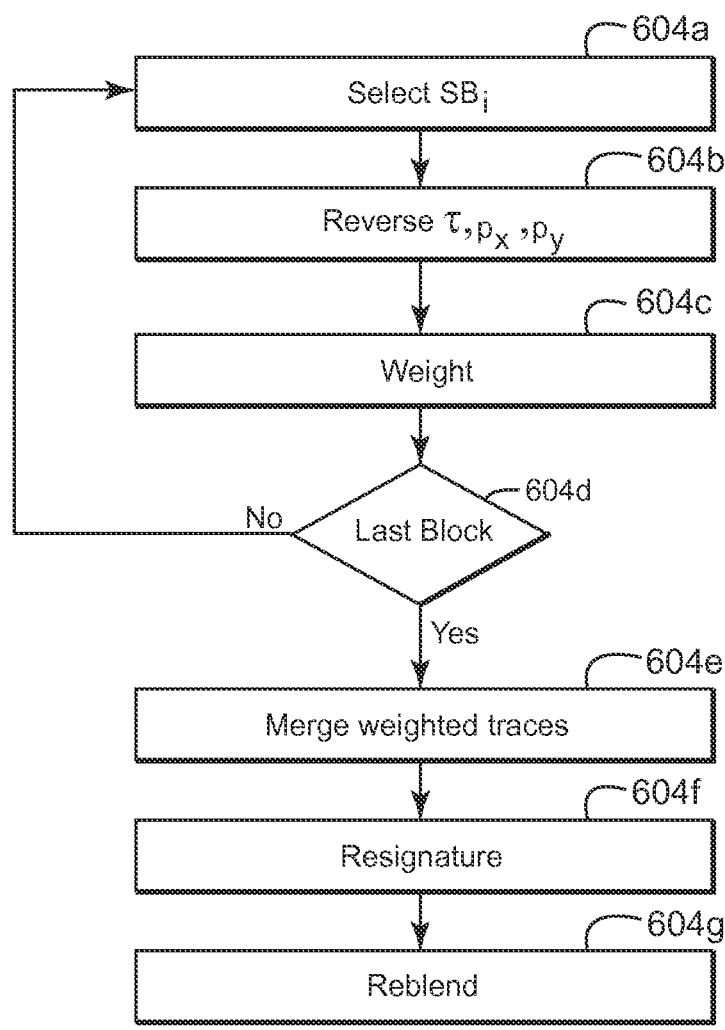

DEVICE AND METHOD FOR DE-BLENDING SIMULTANEOUS SHOOTING DATA

BACKGROUND

1. Technical Field

Embodiments of the subject matter disclosed herein generally relate to methods and systems for generating, acquiring and processing seismic data and, more particularly, to mechanisms and techniques for separating recorded seismic data simultaneously generated by plural seismic sources.

2. Discussion of the Background

Seismic data acquisition and processing may be used to generate a profile (image) of geophysical structures under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where the oil and gas reservoirs are located.

In the past, conventional land seismic acquisition generally employed multiple vibrators (seismic sources) acting one at a time. In land-based operations, the vibrators are positioned at a source location and then actuated. Once activated, the vibrators generate a sweep that typically lasts between five and twenty seconds and typically spans a predetermined range of frequencies. A recording system that is connected to a plurality of receivers, typically geophones for land-based seismic exploration, is employed to receive and record the response data. For reflection seismology, the record length is typically set to equal the sweep length plus a listen time equal to the two-way travel time, which is the time required for the seismic energy to propagate from the source through the earth to the deepest reflector of interest and back to the receiver. The vibrators are then moved to a new source location and the process is repeated.

For marine seismic acquisition, traditionally a vessel tows plural streamers having multiple seismic receivers configured to record seismic data. The vessel also tows a seismic source that imparts energy into the water. The seismic energy travels toward the subsurface and is partially reflected back to the sea surface. The seismic recorders record the reflected seismic waves.

When the source (either land source or marine source) is fired with standard data acquisition, the subsequent recording time is defined so that all useful reflected/diffracted energy is recorded before the next shot fires. This delay time imposes constraints on the acquisition rate and, hence, increases the cost of acquisition.

To reduce the acquisition time, it is possible to simultaneously shoot the sources. Acquisition of simultaneous source data means that the signals from two or more sources interfere at least for part of the record. By acquiring data in this way, the time taken to shoot a dataset is reduced along with the acquisition costs. As an alternative to reducing the acquisition time, a higher density dataset may be acquired in the same time. For such data to be useful, it is necessary to develop processing algorithms to handle source interference (cross-talk noise).

Source interference appears because subsurface reflections from an early source excitation may be comingled with those that have been sourced later, i.e., a "blended source" survey is acquired. Note that this is in contrast to conventional surveying techniques, wherein the returning subsurface reflections from one source are not allowed to overlap with the reflections of another source. Although the blended-source approach has the potential to reduce the time in the field, thereby proportionally reducing the cost of the survey, one problem is that it can be difficult to separate the individual shots thereafter. In other words, what is needed in interpreting seismic data is the depth of each reflector, and the depth of a reflector is determined by reference to its two-way seismic travel time. Thus, in a multiple-source survey it is the goal to determine which of the observed subsurface reflections is associated with each source, i.e., to de-blend the data; otherwise, its two-wave travel time cannot be reliably determined.

In this regard, FIG. 1A shows sources being actuated at different spatial positions 10, 12 and 14 with delay times such that the recorded wavelets 10$a$-$c$ corresponding to spatial position 10 do not interfere (in time) with wavelets 12$a$-$c$ corresponding to spatial position 12. The signal recorded at the receiver can be considered as a continuous recording (16) or separated to form regular seismic traces for each individual shot as shown in FIG. 1B. The traces as illustrated in FIG. 1B form a receiver gather 20. Each trace in the receiver gather 20 relates to a different shot and has a different position on axis X, and each wavelet has a different time on a temporal axis t.

FIG. 2A shows a similar source configuration as in FIG. 1A, but now the sources are simultaneously activated so that, for example, the wavelet 10$c$ might be superposed (in time) with the wavelet 12$a$. FIG. 2B shows the receiver gather 30 formed through pseudo-de-blending. Pseudo-deblending involves forming regular seismic traces from the continuous recording based on the start time of the actuation of each shot with no attempt to mitigate cross-talk noise. The data of FIG. 2B has been shot in less time than the data in FIG. 1B, but cross-talk 32 is observed and noise on one trace is signal on another trace.

Thus, for the gather 30 in FIG. 2B, it is necessary to separate the energy associated with each source (de-blend) as a preprocessing step, and then to proceed with conventional processing. To make the separation easier, it is generally advantageous to use a variety of different source signals, for example, different vibroseis sweeps or pseudo-random sweeps. When energy from a given source is correlated with the sweep signal, this results in a focusing of the energy of that source while keeping energy from other sources dispersed. The actual timing of the shots may also be used to successfully de-blend the energy from the sources.

The randomized timing of source actuation gives rise to a randomness in timing of the cross-talk noise in all domains other than the shot domain. For example, FIG. 3 (corresponding to Hampson et al., Acquisition using simultaneous sources, Leading Edge, Vol. 27, No. 7, the entire content of which is incorporated herein by reference) shows the same recorded seismic data from a marine simultaneous shooting dataset in different domains, i.e., common shot, common receiver, common midpoint, common offset.

Traditionally, de-blending of simultaneous shooting data falls into the following three categories, all of which rely on some degree of randomized shooting. The first category is impulsive de-noising. This method (disclosed for example by Stefani et al., Acquisition using simultaneous sources, 69th EAGE Conference & Exhibition, the entire content of which is incorporated herein by reference) uses the fact that when data is sorted into any domain other than the common shot, the cross-talk noise from other sources has random timing as illustrated in FIG. 3. It is noted that in the common shot domain, the cross-talk noise 40 is continuous. This random timing allows the use of impulsive-noise attenuation techniques which are already available and used in other processing steps, for example, swell-noise attenuation. While this method can be effective for removing the strongest cross-talk energy, low amplitude cross-talk noise is not seen as impulsive and will not be removed.

A second category includes the iterative coherency enhancement/de-noising. Iterative coherency enhancement/de-noising techniques are described in, e.g., Abma et al., Separating simultaneous sources by inversion, 71st EAGE Conference & Exhibition, the entire content of which is incorporated herein by reference, and rely on the fact that cross-talk noise on some traces is a duplication of signal energy on other traces. This means that with the knowledge of the timing of all shots, a signal estimate made for one source can then be used to reduce the level of cross-talk for all other sources.

A third category includes the full modeling of energy from all sources. The full modeling scheme (e.g., Akerberg et al., Simultaneous source separation by sparse Radon transform, 78th Ann. Internat. Mtg.: Soc. of Expl. Geophys, and Moore et al., Simultaneous source separation using dithered sources, 78th Ann. Internat. Mtg.: Soc. of Expl. Geophys, the entire contents of which are incorporated herein by reference) has similarities to the iterative de-noising method, except that this formulation solves the relationship between source energy and cross-talk noise implicitly at the core of the problem formulation. The equations can be formulated as designing a transform domain for each source or spatial area (e.g., tau-p domain, Fourier domain, etc.) such that when it is reverse-transformed and re-blended, the raw input data is reconstructed as accurately as possible in a least squares sense.

This technology has the timings and positioning of all sources at the core of the algorithm and also relies on a sparse solution to the equations. Once the transform domains have been calculated, the final step to de-blend the data requires application of reverse-transform without re-blending. While this method may result in some filtering of the original data, it removes low amplitude cross-talk noise and preserves the primary signal. This method could be considered to be an alternate way of solving the same problem as the iterative coherency enhancement/de-noising technique (with the analogue of sparse least squares Radon versus inversion through "iterative cleaning").

One weakness known in the art of the full modeling approach is that having one transform per source requires that sources must be traveling in a controlled way. While this may be satisfactory for marine acquisition where the boat speed is substantially constant, this is not sufficient for many 3D land blended acquisition patterns where the vibroseis trucks shoot in a less controlled way, sometimes in a random way. While for some land shooting patterns it would be possible to have one transform per source (if the source fired only within a fixed rectangle), the resulting data would be undesirable due to edge effects in the receiver gather at the edge of each source. For this reason, to process blended land acquisition, it is necessary to extend the approach so it is not limited to one transform per source.

Thus, there is a need to develop a method capable of processing blended seismic data while not being limited as noted above.

SUMMARY OF THE INVENTION

According to an exemplary embodiment, there is a method for de-blending seismic data associated with a subsurface of the earth. The method includes receiving seismic data "d" recorded with one or more land receivers, wherein the seismic data includes shot recordings generated by plural sources that are simultaneously actuated; forming either a continuous receiver trace or trace segments from the received seismic data; selecting plural overlapping spatial blocks that cover the surface shot locations; assigning the shot recordings to the plural overlapping spatial blocks; applying a mathematical technique to the recordings to determine de-blended data; and generating an image of the subsurface based on the de-blended data.

According to another exemplary embodiment, there is a seismic data processing device for de-blending seismic data associated with a subsurface of the earth. The device includes an interface configured to receive receiver seismic data "d" recorded with one or more land receivers, wherein the seismic data includes shot recordings generated by plural sources that are simultaneously actuated; and a processor connected to the interface. The processor is configured to form either a continuous receiver trace or trace segments from the received seismic data; select plural overlapping spatial blocks that cover the surface shot locations; assign the shot recordings to the plural overlapping spatial blocks; apply a mathematical technique to the recordings to determine de-blended data; and generate an image of the subsurface based on the de-blended data.

According to still another exemplary embodiment, there is a computer readable medium including computer executable instructions, wherein the instructions, when executed by a processor, implement instructions for de-blending seismic data associated with a subsurface of the earth. The instructions implement the method step discussed above.

BRIEF DESCRIPTION OF THE DRAWINGS

For a more complete understanding of the present invention, reference is now made to the following descriptions taken in conjunction with the accompanying drawings, in which:

FIGS. 1A-B are graphical illustrations of un-blended seismic data;

FIGS. 2A-B are graphical illustrations of blended seismic data;

FIG. 6B is a flowchart of a method detailing a step of the method illustrated in FIG. 6A according to an exemplary embodiment;

DETAILED DESCRIPTION OF THE INVENTION

Figure 3:
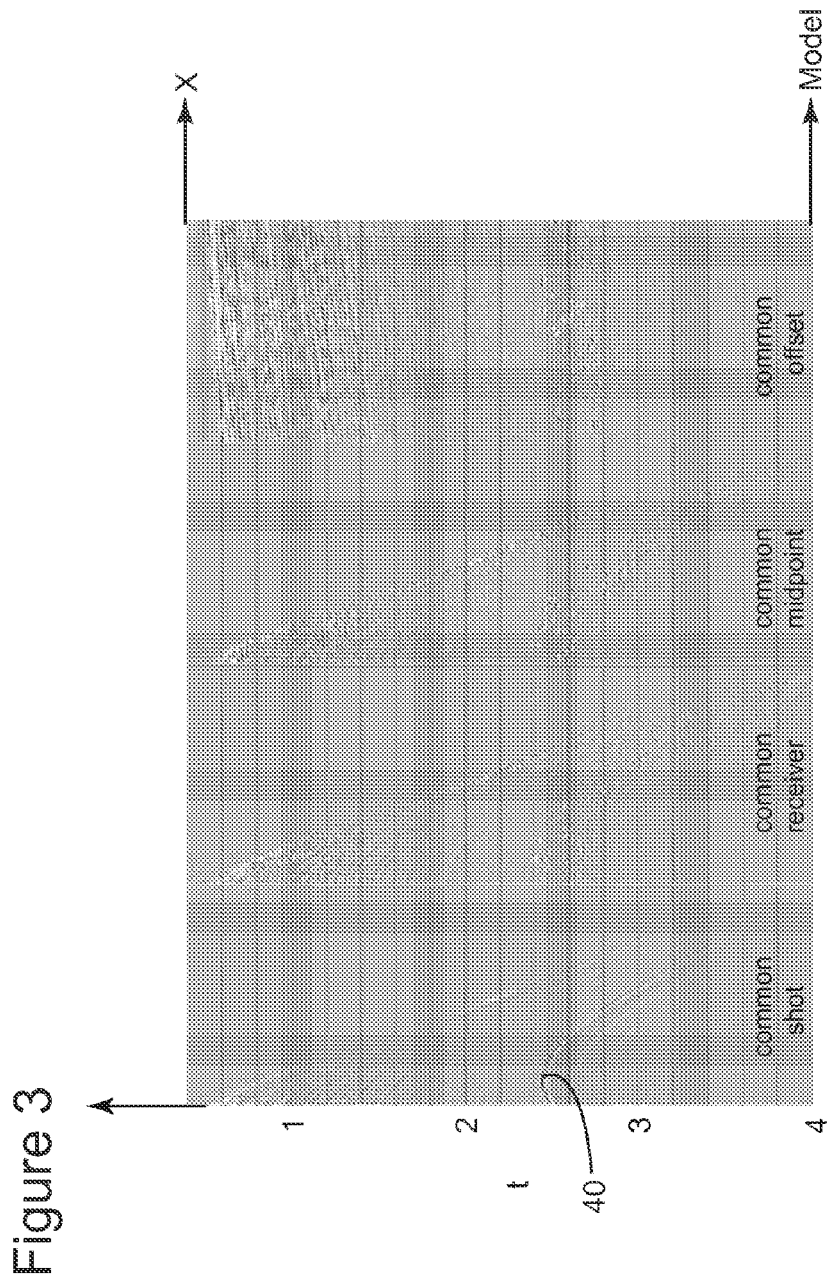
FIG. 3 is a graphical illustration of cross-talk in seismic data.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic system. However, the embodiments to be discussed next are not limited to a land seismic system, but may be applied to a marine seismic system.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for de-blending seismic data acquired by simultaneous shooting. In one application, a single set of equations are formulated to derive a number of sparse time domain three-dimensional (3D) tau-p gathers such that when they are reverse-transformed, tapered together, convolved with a source signature (if different sweeps/pseudo-random sources are used), and re-blended they form the recorded continuous receiver trace as accurately as possible. In another application, the seismic receiver is recording continuously while all sources fire until the receiver gather is complete. In still another application, the exact firing time of each shot needs to be known along with the signature for each shot (unless all sources use the same signature).

Some of the novel features of one or more embodiments are related to the fact that the novel method is applied to the full receiver trace gather, which is necessary for land data, rather than standard receiver traces, which is sufficient for marine seismic data. In addition, one or more embodiments solves three-dimensional (3D) tau-p transforms for the entire receiver gather simultaneously (using tapers) rather than separately working on panels of data and then tapering the subsequent results. This feature is advantageous for de-blending land data where there is interference noise between the data in different processing blocks.

Another novel feature is that the tau-p domains of one or more embodiments are not specific to a single source (as is the case in the existing art). Instead, the present embodiments cover a spatial extent of shot locations which may be from more than one source. The tau-p transform noted above is one of many possible transforms that can be used to de-blend the data. Other transforms may include a Fourier transform, parabolic tau-p transform, hyperbolic tau-p transform, curvelet transforms, etc.

The novel features may be adapted for marine acquisition systems in which a source timing dither is used to introduce randomness into the acquisition. For this situation, the novel method would be configured to work on a panel of data rather than on the entire receiver gather/constant offset section. Thus, only one tau-p transform for each source is used, and it would be possible to work with seismic traces rather than a continuously recorded record.

Figure 4:
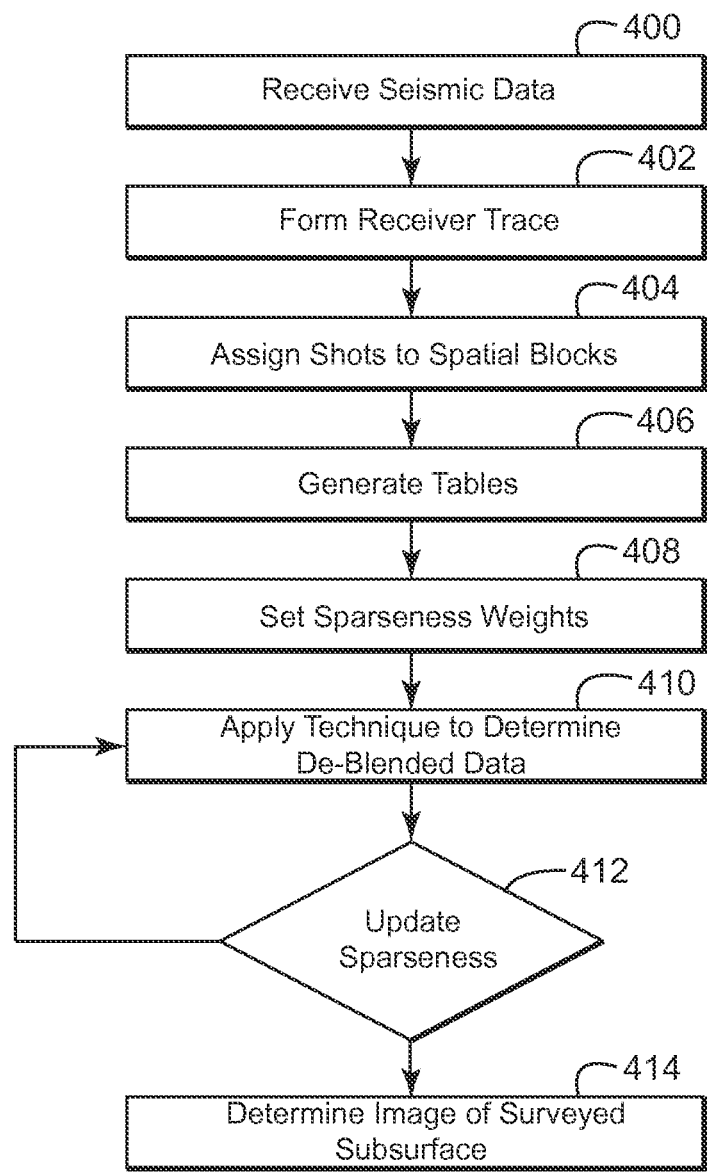
FIG. 4 is a flowchart of a method for de-blending seismic data according to an exemplary embodiment.

A novel method for implementing the novel features noted above is now discussed. According to an exemplary embodiment illustrated in FIG. 4, a step 400 includes receiving seismic data. The seismic data may include pseudo-deblended shots corresponding to one receiver gather from a blended land acquisition. Pseudo-deblending refers to a simple time alignment of the data based on the source actuation time with no attempt to remove cross-talk noise. The timing and the x-y position of the source responsible for the shot may be stored in a header of the seismic data. The traces of the seismic data may be spliced together in step 402 to form a continuous receiver trace.

Figure 5:
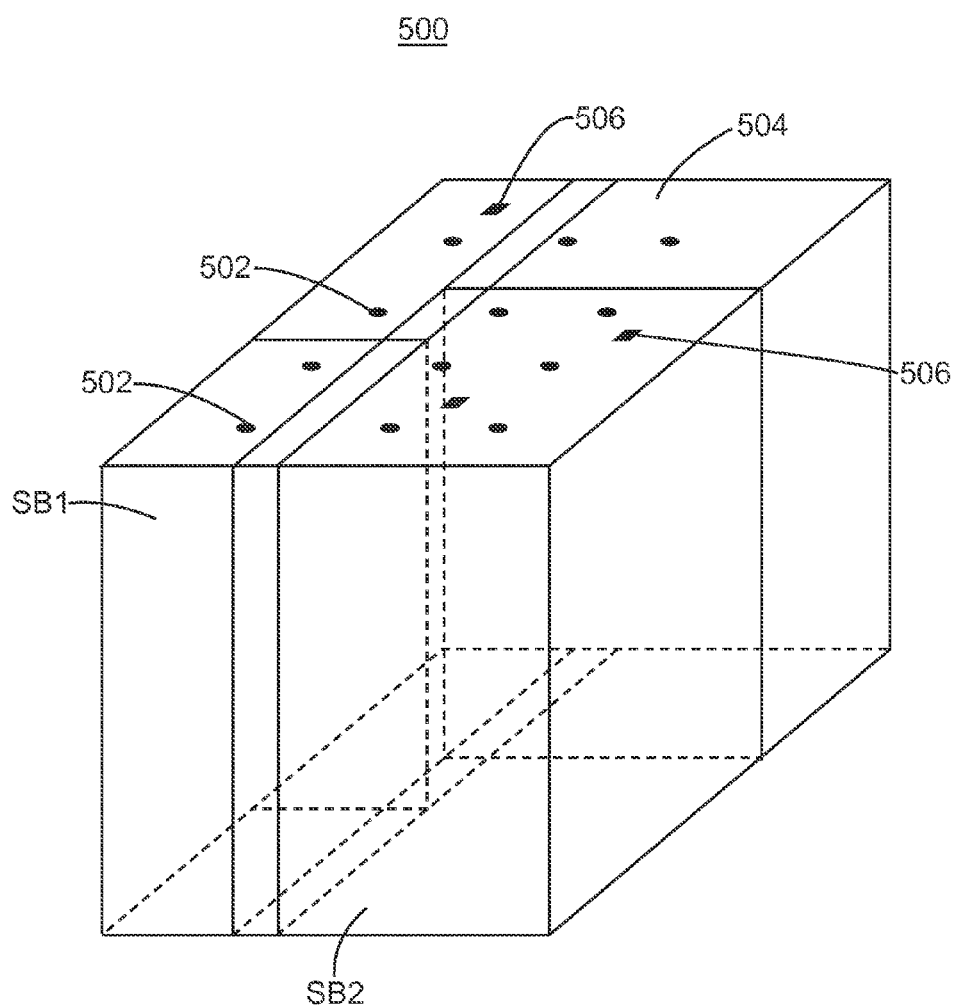
FIG. 5 is a schematic diagram of a subsurface and plural overlapping spatial blocks according to an exemplary embodiment.

In step 404, the shots are assigned to different overlapping spatial blocks. The spatial extent of a spatial block is user-defined, but should be small enough that the receiver gather data within each block can be modeled by the chosen linear transform. When using a 3D tau-p transform this indicates that the events can be considered pseudo-linear within the spatial block. This concept is illustrated in FIG. 5, in which a land seismic system 500 includes plural seismic receivers 502 distributed on the surface 504 of the earth. One or more sources 506 are also located on the surface 504 and actuated to at least partially overlap in time. The shots from the sources are assigned to overlapping spatial blocks SB1, SB2, etc. It is noted that a shot is referred to the seismic wavelets recorded by all the seismic receivers as a consequence of shooting a single source. Thus, a shot describes the actuation of a single source for a predetermined amount of time if the source is a vibratory source, and for an instant if the source is impulsive. Each spatial block SB1, SB2, etc. is transformed in the tau-p domain as discussed later. When solving a least squares problem, the tau-p domains are not known. They cannot be found in the traditional sense because the cross-talk noise will make the tau-p domains noisy and hence, the method will not be able to remove the cross-talk noise. In order to solve the problem, it is needed to derive tau-p transforms that once reverse transformed, merged, re-signature, and re-blended equal to the known input. This is solved with, for example, conjugate gradients. One first step of applying the conjugate gradients is applying the adjoint of L ($L^T$). $L^T$ does actually apply the forward tau-p operator for each block, but the result is not directly of interest as the conjugate gradient scheme iteratively applies $L^T$ and L until the resulting tau-p domains satisfy the defined least squares problem.

It is noted that a linear Radon transform is a special case of a Radon transform where input data is decomposed as a series of straight lines in the time-space domain, and the straight lines are mapped to points in the tau-p domain. For example, hyperbolic events (e.g., those in shot gathers) in the time-space domain map to elliptical curves in the tau-p domain. This process can be referred to as slant-stacking because, to produce the tau-p domain, the input data may be stacked along a series of straight lines. While the present embodiment describes a tau-p transform for transforming the SB blocks, it is noted that the method may use other transforms as noted above.

The method advances to step 406, in which the following information is gathered and organized. The information is organized, for example, in one table per each shot for each processing block. Such a table may include a shot number (given the fact that a source shoots multiple shots during the seismic survey), an actuation time, a processing block identification (note that a shot may be present in more than one processing block), coordinates shot-x and shot-y of the shot (i.e., the source corresponding to the recorded shot) relative to a center of the processing block, taper weights relating to the position of the shot within the processing block and a source identifier for re-signature. The overall length of taper weights is user defined and may be linear or cosine in shape as a function of the shot x and y coordinates. Thus, the table contains the information to be used for reverse tau-px-py transform, tapering, re-signature, and re-blending, which are all discussed next. Organizing the information in the form of a table for each shot for each processing block is one possible approach. It is noted that the information may be organized in a different manner, for example, a single table for all shots and/or processing blocks.

In step 408, sparseness weights are initially set to a predetermined value, e.g., to unity. Next, the recorded seismic data is solved by applying a technique in step 410 for de-blending the data. This least squares solution often is not a reliable estimate of the deblended signal as the cross-talk noise contaminates the tau-p data. For this reason, it is necessary to introduce sparseness to the linear equations, initially based on the initial least squares result. The technique may be any one of those known in the art and an example of such a technique is discussed later. In step 412, the sparseness is updated for a next iteration and step 410 is then repeated until the sparseness is sufficient to separate signal from cross-talk noise. In practice this is a user parameter which is tested. Then, the de-blended seismic data may be used in step 414 with traditional processing algorithms to determine an image of the desired subsurface. Alternatively, this result of the deblending exercise can be used to make an estimate of the cross-talk noise which can be subtracted from the initial pseudo-deblending result. This route is often preferable as it reduces any possibility of modifying the signal.

Figure 6A:
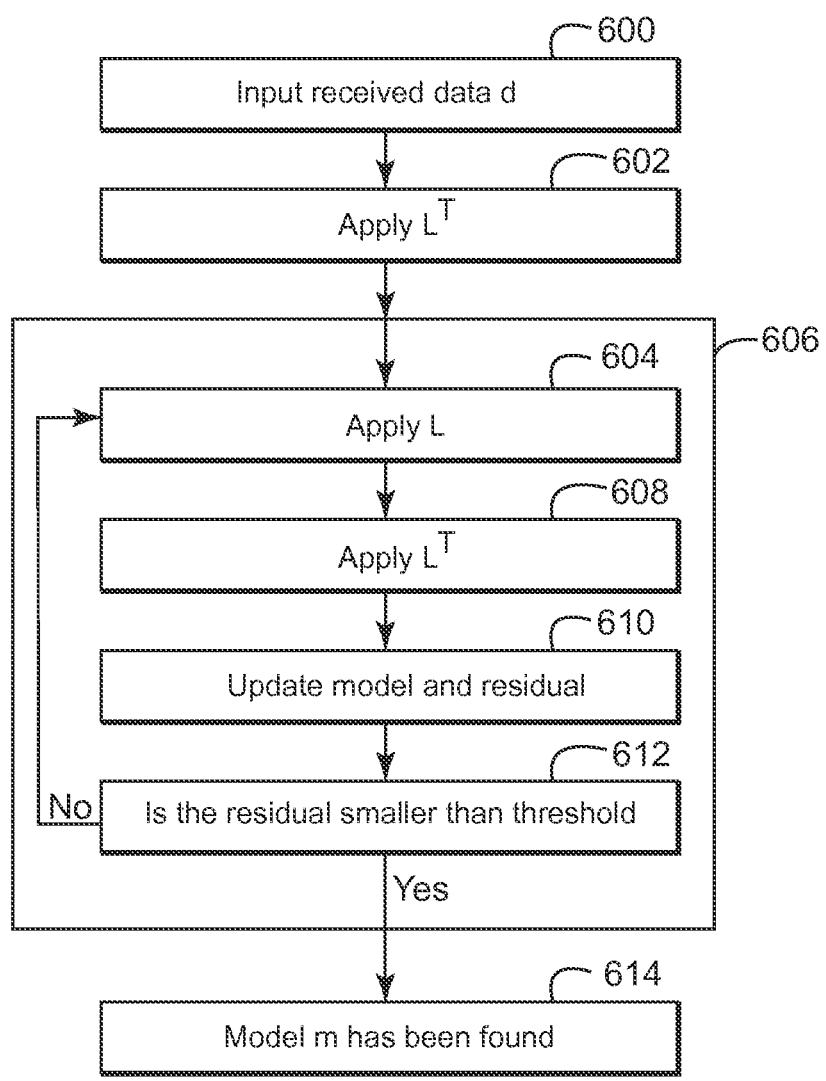
FIG. 6A is a flowchart of steps of a method for de-blending seismic data according to an exemplary embodiment.

Step 410 is now discussed in more detail. The technique applied in step 410 may be, for example, the conjugate gradient algorithm. Other mathematical algorithms may be used to de-blend the recorded seismic data. The general problem to be solved in step 410 may be described as d=Lm, where d is a vector and represents the input data, i.e., a continuous recording trace at the receiver, m is a vector containing 3D tau-p data containing plural spatial blocks, and L is a matrix and represents the reverse slant stack, tapering between spatial blocks, re-signature, and re-blending. The conjugate gradient algorithm solves this linear equation through the successive application of L and $L^T$, where $L^T$ is the transpose of L. FIG. 6A illustrates the processes performed in step 410. The conjugate gradient algorithm applies first L and then $L^T$ in order to de-blend the data.

In this regard, it is noted that for over-determined systems (when the desirable number of model points is smaller than the number of data points) the model, m, can be found by solving the equation $L^T d = L^T L m$. In this case, the method first calculates $L^T d$ as d is known and then the conjugate gradients process applies L followed by $L^T$ to iteratively find m. For an under-determined system, (when the desirable number of model points is larger than the number of data points) the model, m, can be found by solving the equation $d = L L^T L^{-T} m$. In this case, the method considers $L^{-T} m$ to be 'the unknown' and the process of conjugate gradients iteratively applies $L^T$ followed by L to d to find $L^{-T} m$. When $L^{-T} m$ has been found, the method pre-multiplies it by $L^T$ to find m.

This process is generically illustrated in FIG. 6A, where the input data d (received data) is received in step 600. Then, in step 602, matrix $L^T$ is applied to the input data d to form $L^T d$. Instead of forming and applying matrix L and matrix $L^T$ directly, it is computationally efficient to apply L as a set of smaller linear operators. Thus, the matrix L is applied in step 604 to plural spatial blocks $SB_i$ as discussed later. Step 604 is part of the conjugate gradients process 606 noted above. In step 608, as part of the conjugate gradients process 606, the matrix $L^T$ is applied on the output from the step 604. In step 610, the obtained model is updated and a residual is estimated. If the residual is small enough when compared to a predetermined threshold in step 612, the method advances to step 614 in which the model m has been found. Otherwise, the method returns to step 604.

Figure 7:
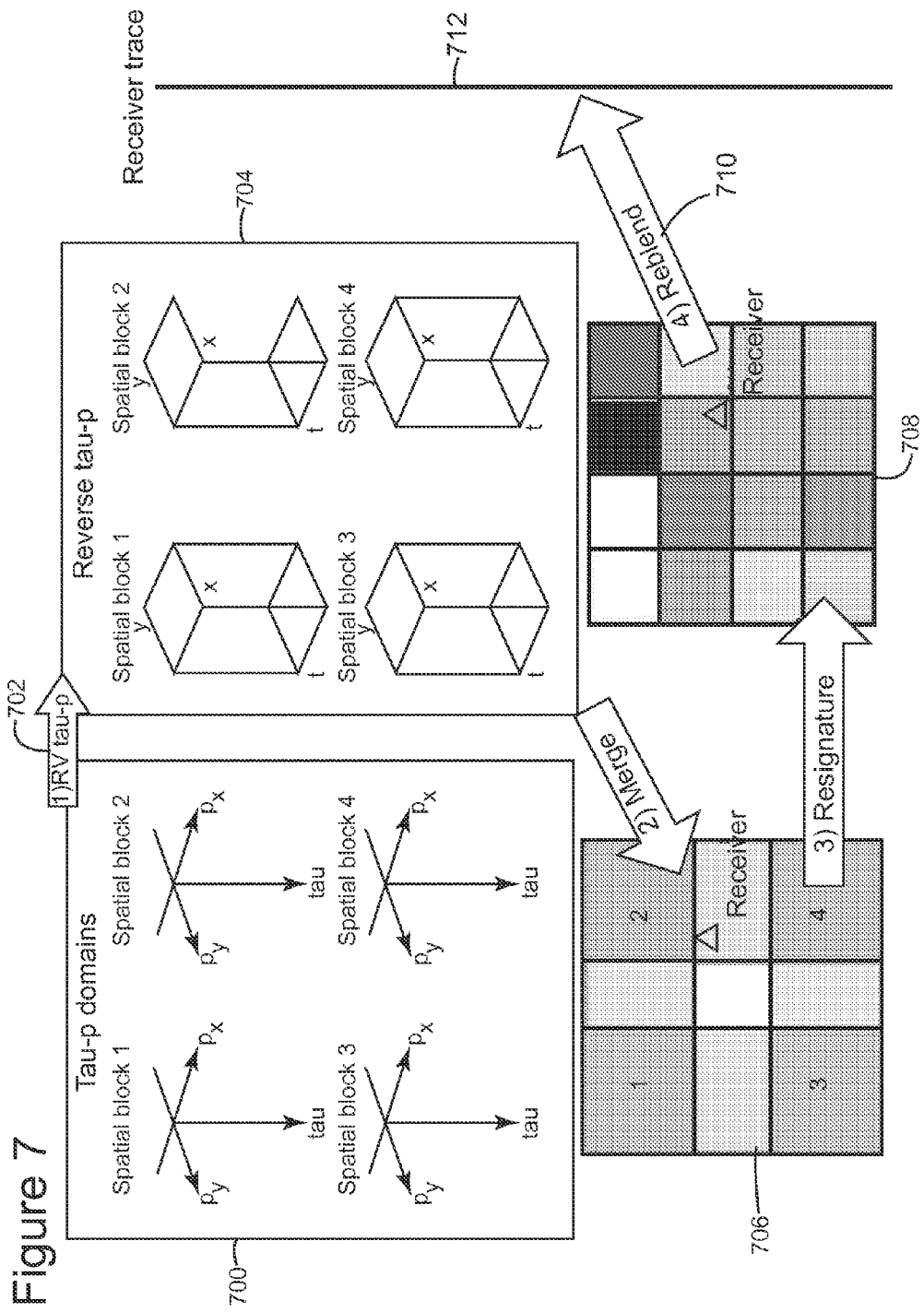
FIG. 7 is a graphical illustration of various steps of a method for de-blending data according to an exemplary embodiment.

Step 604 of applying the matrix L is now discussed in more detail with regard to FIG. 6B. As discussed above, plural spatial blocks $SB_i$ are selected in step 604a. The spatial blocks $SB_i$ in the tau-p domain are illustrated in FIG. 7 by block 700. Block 700 shows only four spatial blocks in the tau-p domain. However, this number is illustrative and any number of spatial blocks may be used. For example, in one exemplary embodiment the number of spatial blocks is on the order of hundreds. The first stage in applying L in step 604 involves selecting a spatial block $SB_i$ in step 604a and looping through all spatial blocks, and for each spatial block reverse tau-px-py transforming the data in step 604b to the shot locations as acquired. FIG. 7 shows the reverse transformation 702 and the transformed data 704 to the shot locations. Each tau-p domain relates to a spatial block, and the reverse tau-p transform generates a plurality of traces relating to different shots. The vector m includes traces from many tau-px-py domains. The reverse tau-px-py transform generates traces at the shot positions and may be performed using Sinc functions (e.g., $$sinc(x) = \frac{\sin(\pi x)}{\pi x})$$

or alternatively through phase shifts in the temporal frequency domain ($e^{2\pi i f \tau}$).

In step 604c, the shots (traces) are weighted by the taper weight from the corresponding table generated in step 406. The process advances to step 604d in which the algorithm loops through all the spatial blocks and also through all the px-py traces, px-py trace samples, and the shots in the tau-p domain, thus returning to step 604a until all the spatial blocks are considered.

After processing all the spatial blocks, the resulting shots from different spatial blocks are merged in step 604e using taper weights computed previously as illustrated by block 706 (which is a de-signature receiver gather) in FIG. 7. In step 604f, resignature is applied through convolution of all shots with corresponding shot signatures (vibrator sweeps) as illustrated by block 708 (each square in block 708 represents an area acquired by one land source) in FIG. 7. In other words, resignature involves convolving each trace with it's corresponding source signature, e.g., a vibrator sweep. Finally, the re-signatured data is re-blended in step 604g (see step 710 in FIG. 7) based on the time of actuation of each shot to form a continuous recording trace 712 as illustrated in FIG. 7. This continuous recording trace should match as accurately as possible with that recorded in the field. The shot signatures may be stored in the table generated in step 406 in FIG. 4.

Having applied the L operator, the process advances to step 608 in which the $L^T$ operator is applied as already discussed with respect to FIG. 6A. Step 608 may include most of the steps discussed with regard to step 410, i.e., the $L^T$ operator may be applied similarly to the L operator and for this reason the application of $L^T$ is not repeated herein.

A determination is made in step 610 whether the tau-p sparseness needs to be updated. The number of times the sparseness is updated will depend on the complexity of geology and similarity of sweeps between the vibrators. In practice, this is tested and set as a user parameter. The sparseness may be updated, for example, by taking the envelope of the tau-px-py data. This is commonly done by calculating the Hilbert transform of the tau-px-py traces following by calculating the envelope$_i$=SQRT(samp$_i^2$+hilbert$_i^2$), where i is the sample number on the trace, samp relates to the tau-p trace and Hilbert relates to the Hilbert transform of the tau-p trace.

If the sparseness needs to be updated, the process updates it in step 610 and then the process advances to step 612 to estimate the residual. Depending on the result of this step, the process may return to step 604 to repeat the calculations noted above. Then, the process advances to step 414 as already discussed with regard to FIG. 4.

Often it is more desirable to use the signal estimate to make an estimate of the cross-talk noise and to subtract the cross-talk noise from the original pseudo-deblended receiver gather data. This has the advantage of limiting any potential modification of the signal amplitudes. Thus, the de-blended data may be used directly or to make an estimate of the cross-talk noise which can be subtracted from the pseudo-deblended receiver gather data.

One or more embodiments discussed above has an advantage over the impulsive noise attenuation because it can remove lower amplitude cross-talk noise. Also, because one or more of the embodiments does not rely on impulsive noise thresholding, it is less likely to attenuate the signal. Further, the novel embodiments extend traditional marine de-blending techniques to the land case, where one transform per source is no longer sufficient, and all overlapping blocks need to be solved simultaneously.

Figure 8:
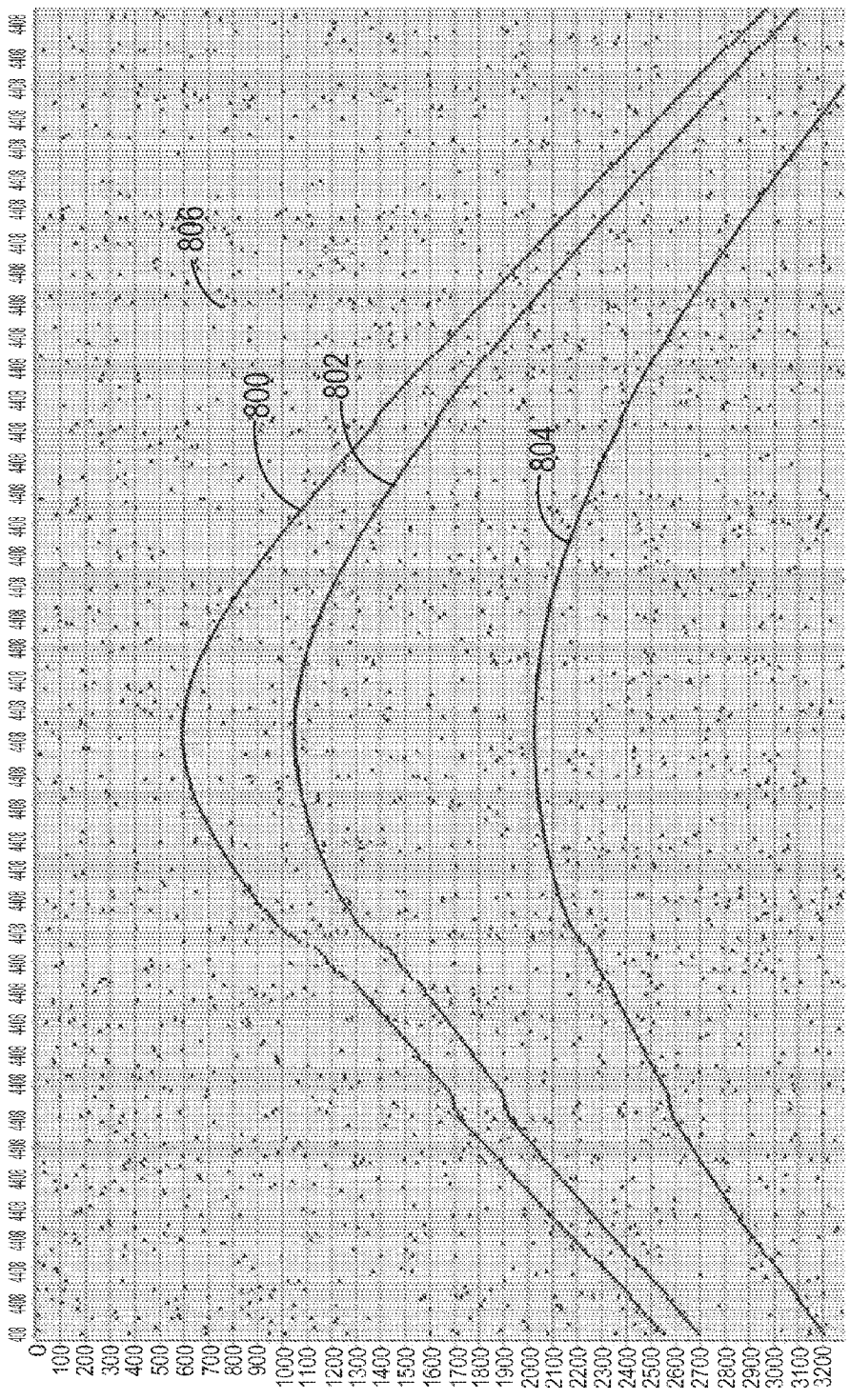
FIG. 8 is a graph illustrating blended data.
Figure 9:
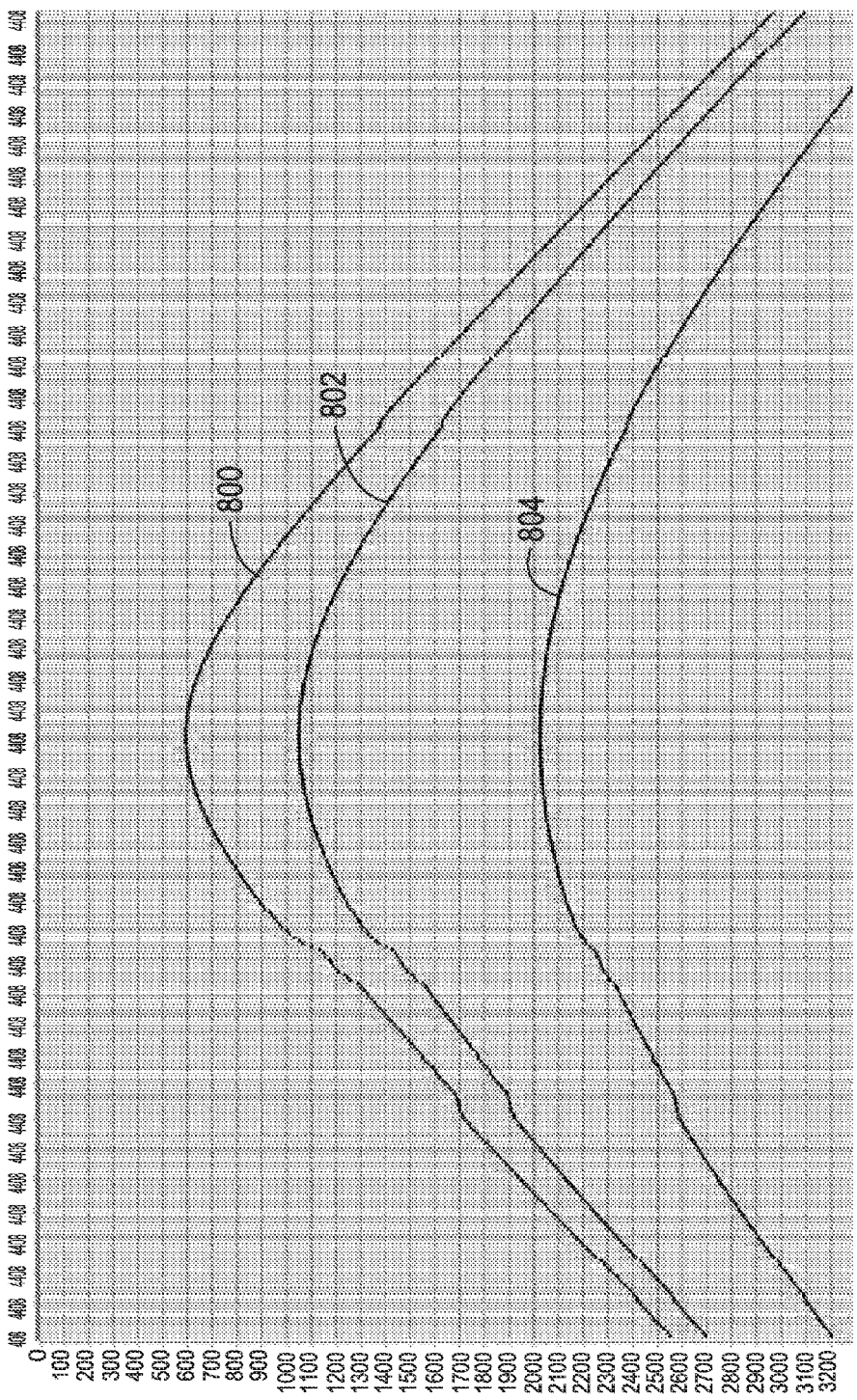
FIG. 9 is a graph illustrating de-blended data according to an exemplary embodiment.

An example of applying the above-noted method to synthetic data having heavy cross-talk is now discussed with reference to FIG. 8. FIG. 8 shows pseudo-de-blended data including plural traces. Events 800, 802 and 804 are observed, but also the cross-talk 806. After applying the algorithm discussed with regard to FIGS. 4 and 6, the obtained de-blended data is illustrated in FIG. 9. It is noted that the events 800, 802 and 804 are still present, but the cross-talk 806 has been removed.

Figure 10:
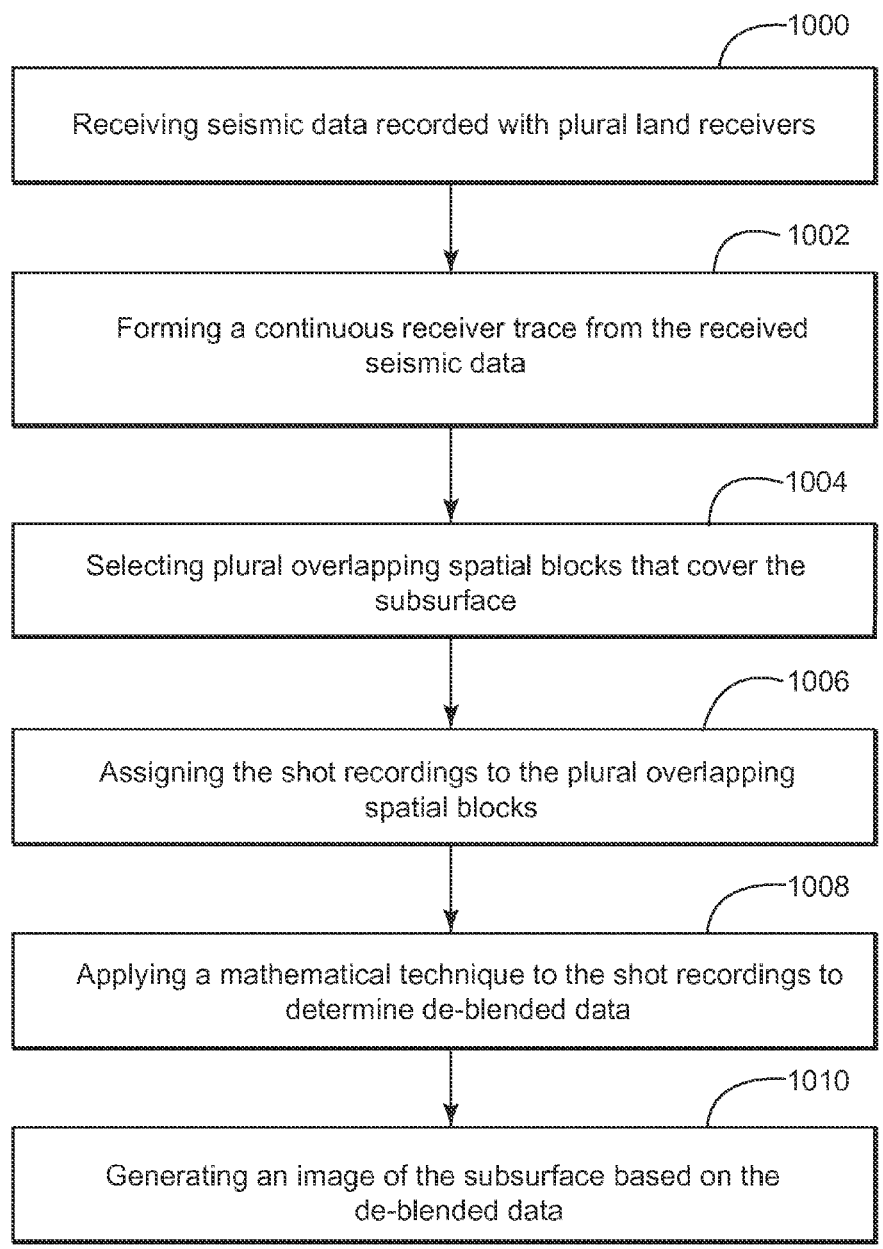
FIG. 10 is a flowchart of a method for de-blending seismic data according to an exemplary embodiment.

A flowchart illustrating steps of a method for de-blending seismic data associated with a subsurface of the earth is now discussed with reference to FIG. 10. The method includes a step 1000 of receiving seismic data recorded with plural land receivers, wherein the seismic data includes shot recordings generated by plural sources that are simultaneously actuated; a step 1002 of forming a continuous receiver trace from the received seismic data; a step 1004 of selecting plural overlapping spatial blocks that cover the subsurface; a step 1006 of assigning the shot recordings to the plural overlapping spatial blocks; a step 1008 of applying a mathematical technique to the shot recordings to determine de-blended data; and a step 1010 of generating an image of the subsurface based on the de-blended data.

Figure 11:
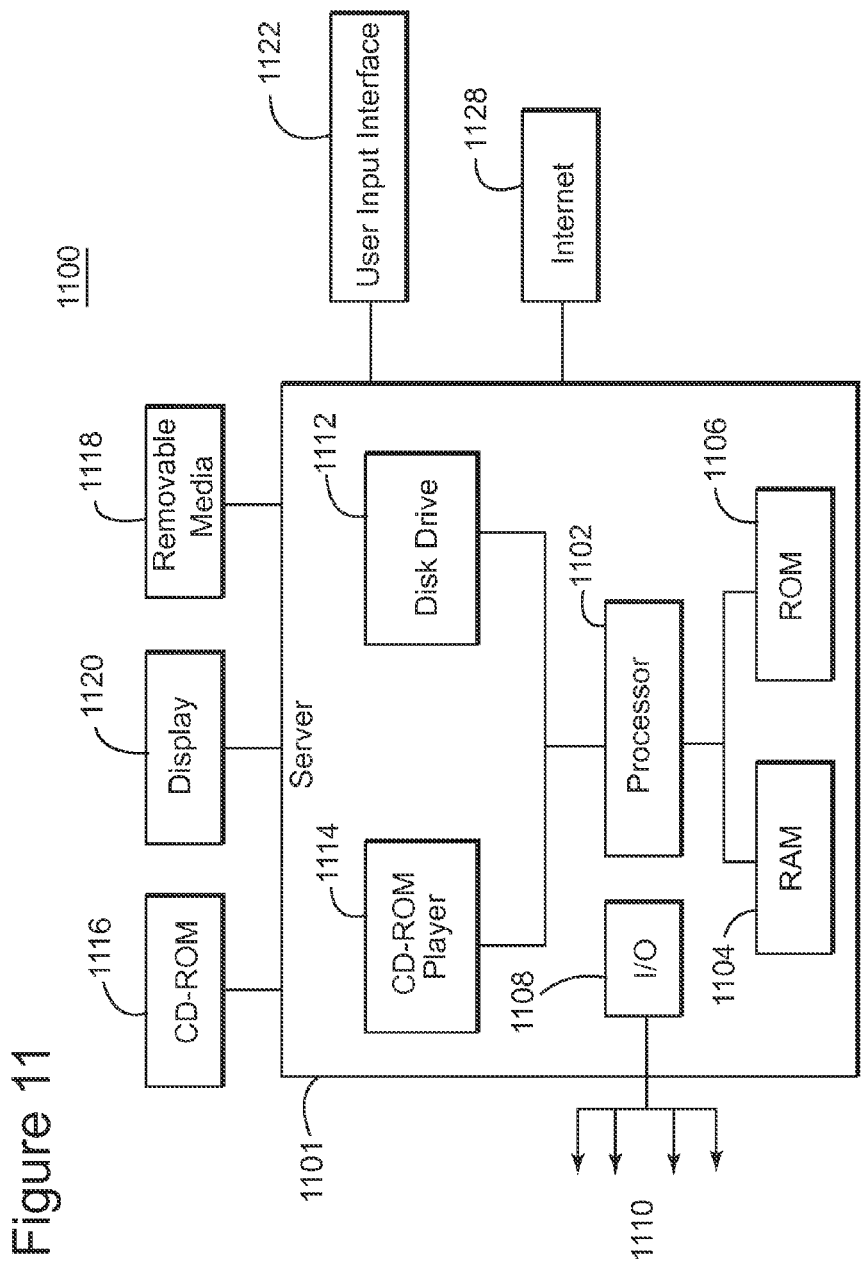
FIG. 11 is a schematic diagram of a computing device that implements a method for de-blending data.

The above method and others may be implemented in a computing system specifically configured to calculate the image of the subsurface. An example of a representative computing system capable of carrying out operations in accordance with the exemplary embodiments is illustrated in FIG. 11. Hardware, firmware, software or a combination thereof may be used to perform the various steps and operations described herein.

The exemplary computing system 1100 suitable for performing the activities described in the exemplary embodiments may include a server 1101. Such a server 1101 may include a central processor (CPU) 1102 coupled to a random access memory (RAM) 1104 and to a read-only memory (ROM) 1106. The ROM 1106 may also be other types of storage media to store programs, such as programmable ROM (PROM), erasable PROM (EPROM), etc. The processor 1102 may communicate with other internal and external components through input/output (I/O) circuitry 1108 and bussing 1110, to provide control signals and the like. The processor 1102 carries out a variety of functions as are known in the art, as dictated by software and/or firmware instructions.

The server 1101 may also include one or more data storage devices, including a hard drive 1112, CD-ROM drives 1114, and other hardware capable of reading and/or storing information such as DVD, etc. In one embodiment, software for carrying out the above-discussed steps may be stored and distributed on a CD- or DVD-ROM 1116, removable memory device 1118 or other form of media capable of portably storing information. These storage media may be inserted into, and read by, devices such as the CD-ROM drive 1114, the disk drive 1112, etc. The server 1101 may be coupled to a display 1120, which may be any type of known display or presentation screen, such as LCD, LED displays, plasma displays, cathode ray tubes (CRT), etc. A user input interface 1122 is provided, including one or more user interface mechanisms such as a mouse, keyboard, microphone, touchpad, touch screen, voice-recognition system, etc.

The server 1101 may be coupled to other computing devices, such as landline and/or wireless terminals via a network. The server may be part of a larger network configuration as in a global area network (GAN) such as the Internet 1128, which allows ultimate connection to various landline and/or mobile client devices. The computing device may be implemented on a vehicle that performs a land seismic survey.

The disclosed exemplary embodiments provide a system and a method for de-blending recorded seismic data. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for de-blending seismic data associated with a subsurface of the earth, the method comprising:
receiving seismic data "d" that includes shot recordings generated by plural sources that are simultaneously actuated;
forming either a continuous receiver trace or trace segments from the received seismic data;
selecting plural overlapping spatial blocks that cover shot locations of the plural sources;
assigning the shot recordings to the plural overlapping spatial blocks;
determining a linear de-blended model "m" of the seismic data by reverse transforming tau-px-py data corresponding to the overlapped spatial blocks, merging traces together from all spatial blocks, convolving the merged traces with corresponding source signatures, and re-blending the resulting traces; and generating an image of the subsurface based on the de-blended model m.

2. The method of claim 1, wherein the receiving step comprises:

receiving a receiver gather from a blended land acquisition.

3. The method of claim 1, wherein plural shot recordings correspond to a single overlapping spatial block.

4. The method of claim 1, further comprising:

collecting data regarding a shot location, a processing block, shot coordinates, taper weights, and a source identifier.

5. The method of claim 1, wherein the step of determining a linear de-blended model "m" further comprises:

applying a linear operator L and the adjoint operator $L^T$ to the input data "d," to derive the linear de-blended model "m" of the seismic data using conjugate gradients.

6. The method of claim 5, wherein applying the operator L comprises:

tapering of traces within each spatial block based on their spatial location.

7. The method of claim 5, further comprising:

updating a sparseness of the model "m."

8. The method of claim 7, further comprising:

determining a residual of the model; and estimating whether the residual is smaller than a predetermined threshold.

9. The method of claim 8, further comprising:

considering that the model "m" has been determined when the residual is smaller than the predetermined threshold.

10. The method of claim 9, wherein the model "m" is used to make an estimate of the deblended data or is used to make an estimate of cross-talk noise that is subtracted from pseudo-deblended data.

11. A seismic data processing device for de-blending seismic data associated with a subsurface of the earth, the device comprising:

an interface configured to receive seismic data "d" that includes shot recordings generated by plural sources that are simultaneously actuated; and a processor connected to the interface and configured to, form either a continuous receiver trace or trace segments from the received seismic data;

select plural overlapping spatial blocks that cover shot locations of the plural sources;

assign the shot recordings to the plural overlapping spatial blocks;

determining a linear de-blended model "m" of the seismic data by reverse transforming tau-px-py data corresponding to the overlapped spatial blocks, merging traces together from all spatial blocks, convolving the merged traces with corresponding source signatures, and re-blending the resulting traces; and generate an image of the subsurface based on the de-blended model m.

12. The device of claim 11, wherein the processor is further configured to:

receive a receiver gather from a blended land acquisition.

13. The device of claim 11, wherein plural shot recordings correspond to a single overlapping spatial block.

14. The device of claim 11, wherein the processor is further configured to:

collect data regarding a shot location, a processing block, shot coordinates, taper weights, and a source identifier.

15. The device of claim 11, wherein the processor is further configured to:

apply a linear operator L and the adjoint operator $L^T$ to the input data "d," to derive the linear de-blended model "m" of the seismic data using conjugate gradients.

16. The device of claim 15, wherein applying the operator L comprises:

tapering of traces within each spatial block based on their spatial location.

17. The device of claim 15, wherein the processor is further configured to:

update a sparness of the model "m."

18. The device of claim 17, wherein the processor is further configured to:

determine a residual of the model; and estimate whether the residual is smaller than a predetermined threshold.

19. The device of claim 18, wherein the processor is further configured to:

consider that the model "m" has been determined when the residual is smaller than the predetermined threshold.

20. A non-transitory computer readable medium including computer executable instructions, wherein the instructions, when executed by a processor, implement instructions for de-blending seismic data associated with a subsurface of the earth, the instructions comprising:

receiving seismic data "d" that includes shot recordings generated by plural sources that are simultaneously actuated;

forming either a continuous receiver trace or trace segments from the received seismic data;

selecting plural overlapping spatial blocks that cover shot locations of the plural sources;

assigning the shot recordings to the plural overlapping spatial blocks;

determining a linear de-blended model "m" of the seismic data by reverse transforming tau-px-py data corresponding to the overlapped spatial blocks, merging traces together from all spatial blocks, convolving the merged traces with corresponding source signatures, and re-blending the resulting traces; and generating an image of the subsurface based on the de-blended model m.

21. The medium of claim 20, wherein the step of determining the linear de-blended model m further comprises:

applying a linear operator L and the adjoint operator $L^T$ to the input data "d," to derive the linear de-blended model "m" of the seismic data using conjugate gradients, and wherein applying the operator L comprises:

tapering of traces within each spatial block based on their spatial location.

* * * * *